(12) United States Patent
Ostridge et al.

(10) Patent No.: US 11,725,930 B2
(45) Date of Patent: Aug. 15, 2023

(54) VESSEL LOAD MEASUREMENT SYSTEM

(71) Applicant: Leica Geosystems Inc., Norcross, GA (US)

(72) Inventors: Richard Ostridge, Suwanee, GA (US); Theodore B. Miller, III, Pendergrass, GA (US)

(73) Assignee: Leica Geosystems Inc., Norcross, GA (US)

( * ) Notice: Subject to any disclaimer, the term of this patent is extended or adjusted under 35 U.S.C. 154(b) by 1196 days.

(21) Appl. No.: 16/279,510

(22) Filed: Feb. 19, 2019

(65) Prior Publication Data
US 2020/0263974 A1 Aug. 20, 2020

(51) Int. Cl.
*G01B 11/02* (2006.01)
*B63J 99/00* (2009.01)
*G01C 9/00* (2006.01)
*B63B 79/00* (2020.01)

(52) U.S. Cl.
CPC ............. *G01B 11/026* (2013.01); *B63J 99/00* (2013.01); *G01C 9/00* (2013.01); *B63B 79/00* (2020.01)

(58) Field of Classification Search
CPC . G01B 11/026; G01B 11/002; G01B 11/0608; B63J 99/00; B63B 79/00; G01C 9/00; G01C 13/00
See application file for complete search history.

(56) References Cited

U.S. PATENT DOCUMENTS

| 7,325,328 B1 | 2/2008 | Morton et al. | |
| 2005/0188763 A1* | 9/2005 | Krejci | G01C 5/06 73/865.9 |

* cited by examiner

*Primary Examiner* — Yuen Wong
(74) *Attorney, Agent, or Firm* — Nutter McClennen & Fish LLP

(57) ABSTRACT

A vessel load measurement system includes a laser measurement system configured to measure distances and angles by directing a laser of the laser measurement system onto remote laser targets and a controller configured to use the laser measurement system to measure a height of a first laser target placed at a known location on a vessel, obtain pitch and roll measurements of the vessel, and compute at least one vessel corner height based on the measured height of the first laser target at the known location on the vessel, the pitch and roll measurements of the vessel, and known dimensions of the vessel. The first laser target may be part of a jig that can be placed at a known location on the vessel. The jig may include at least one tilt sensor. An additional laser target may be used to measure the water level.

20 Claims, 13 Drawing Sheets

VESSEL LOAD MEASUREMENT SYSTEM

FIELD OF THE INVENTION

The invention generally relates to a vessel load measurement system for determining at least one vessel corner height in a vessel loading environment such as for loading of barges, ships, or other vessels.

BACKGROUND OF THE INVENTION

Various types of vessels are used to transport materials such as coal, grain, oil, chemicals, trash, recyclable materials, sand, gravel, timber, iron ore and other minerals such as through waterways (e.g., rivers, canals, oceans, etc.), on land, and through the air. It typically is advantageous to load a vessel evenly and with an optimal amount of material. Uneven or excessive loading of the vessel can result in inefficient and/or unsafe transport.

As but one example, uneven of excessive loading of a barge can result in excess drag due to the barge being too low or unlevel in the water, which can increase costs (e.g., fuel costs) and transportation time, and in some cases can be a safety hazard. On the other hand, under-loading of the barge can result in added costs when additional trips are needed to transport the material.

Typically, barges are loaded by passing the barge through a loading zone as material is loaded onto the barge. In many cases, barges move slowly but continuously through the loading zone. Typically, an operator can control the rate at which material is loaded onto the barge, but it often is difficult to control the overall loading process because it can be difficult to determine the amount and distribution of materials in the barge as it moves through the loading zone.

Loading generally starts at the front of the barge and continues toward the back of the barge as the barge moves through the loading zone. As material is loaded at the front of the barge, the front of the barge tends to sink lower in the water, but the barge tends to level off as material is loaded into the middle and back of the barge. Generally speaking, the goal is to load all parts of the barge evenly so that the barge ends up level and at a proper depth for efficient transport of the material.

In order to help control the loading of the barge, they heights of the four corners of the barge above the water level may be determined by reading draft marks on the side of the barge, or by making measurements using a handheld measurement rod held over the side of the barge and lowered to the water level, as shown in FIG. 1. The readings are reported to the operator who is controlling the loading of material into the barge, e.g., via radio. The operator controls the loading of material into the barge based on the readings, using his or her skill and experience to try to load the barge to be level and at the proper depth. This technique is labor-intensive, inefficient, and has safety risks. Also, there can be inaccuracies in the measurements as well as delays in reporting the readings to the operator, which can make it difficult to achieve optimal loading. Furthermore, the corners of barges are not always easily accessible and it is not always possible to see all sides of a barge from a convenience vantage point, making corner measurements and readings difficult in some cases.

Further complicating the loading process is that the amount of material that can be transported in each barge can vary day-to-day and even throughout the day due to changes in the depth of the water. Generally speaking, each day, there is a reporting of the depth of the waterway, which in turn will determine the amount of material that can be filled into each barge so that the bottom of the vessel will not scrape along the bottom of the waterway bed. The operator will load the barge to be as close as possible to the draft as allowed for that day or time. From time to time, an overfilled barge will have to stop in mid travel to unless the excess onto another barge, a procedure that is excessively expensive and can be avoided if the material was more properly loaded onto the barge initially.

Another complicating factor is that different types and sizes of barges may be used to move material such that different height tolerances may apply to different barges. For example, a height of five feet above the water line at a particular corner of a barge might be acceptable for one type of barge but not for another type of barge.

One attempt to solve some of these problems can be found in U.S. Pat. No. 7,325,328 (Morton et al.), which discloses various types of surveying devices for making and conveying measurements associated with the draft of a vessel.

Other types of vessels are used to transport a wide variety of products and materials and often suffer from the same or similar issues as with barges.

SUMMARY OF VARIOUS EMBODIMENTS

In accordance with one embodiment of the invention, a vessel load measurement system comprises a laser measurement system configured to measure distances and angles by directing a laser of the laser measurement system onto remote laser targets; a first laser target for placement at a known location on a vessel; at least one tilt sensor for measuring pitch and roll of the vessel; and a controller configured to use the laser measurement system to measure a height of the first laser target on the vessel and to compute at least one vessel corner height based on the measured height of the first laser target at the known location on the vessel, the pitch and roll measurements, and known dimensions of the vessel.

In various alternative embodiments, the controller may be configured to compute the at least one vessel corner height relative to the level of water in which the vessel floats. In this respect, the vessel load measurement system may include a second laser target for placement on a surface that changes height based on the water level, wherein the controller is further configured to use the laser measurement system to measure a height of the second laser target and to determine the water level based on the measured height of the second laser target. The surface may be a floating dock that is a known height above the water level and wherein the second laser target is a known height above the floating dock, or the surface may be the water itself.

Additionally or alternatively, the first laser target and the at least one tilt sensor may be part of a jig that is configured to be placed at a known location on the vessel. The vessel load measurement system may include a database of vessel dimensions for different vessel types, wherein the controller is further configured to obtain the known dimensions of the vessel from the database. The controller may be further configured to transmit the at least one vessel corner height to an operator terminal, which may be configured to receive the at least one vessel corner height and to display the at least one vessel corner height on a display screen.

In accordance with another embodiment of the invention, a vessel load to measurement system comprises a laser measurement system configured to measure distances and angles by directing a laser of the laser measurement system onto remote laser targets; and a controller configured to use the laser measurement system to measure a height of a first laser target placed at a known location on a vessel, obtain pitch and roll measurements of the vessel, and compute at least one vessel corner height based on the measured height of the first laser target at the known location on the vessel, the pitch and roll measurements of the vessel, and known dimensions of the vessel.

In various alternative embodiments, the controller may be configured to compute the at least one vessel corner height relative to the level of water in which the vessel floats. In this respect, the vessel load measurement system may include a second laser target for placement on a surface that changes height based on the water level, wherein the controller is further configured to use the laser measurement system to measure a height of the second laser target and to determine the water level based on the measured height of the second laser target. The surface may be a floating dock that is a known height above the water level and wherein the second laser target is a known height above the floating dock, or the surface may be the water itself.

Additionally or alternatively, the controller may be configured to receive the pitch and roll measurements from at least one tilt sensor on the vessel. The vessel load measurement system may include a database of vessel dimensions for different vessel types, wherein the controller is further configured to obtain the known dimensions of the vessel from the database. The controller may be further configured to transmit the at least one vessel corner height to an operator terminal, which may be configured to receive the at least one vessel corner height and to display the at least one vessel corner height on a display screen.

In accordance with another embodiment of the invention, a jig for placement at a known location on a vessel as part of a vessel load measurement system comprises a laser target for use by the barge measurement system in measuring a height of the laser target on the vessel; at least one tilt sensor for measuring pitch and roll of the vessel; and a wireless communication system for transmitting the pitch and roll measurements to the vessel load measurement system.

In various alternative embodiment, the laser target may be a prism or a reflector.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

In exemplary embodiments, a vessel load measurement system computes the height of at least one corner of a vessel based on a vertical height measurement, a pitch angle measurement, and a roll angle measurement of the vessel. Specifically a vertical height measurement device (referred to herein as a "jig") is placed at a known location on the vessel, and a vertical height measurement is taken using the jig, e.g., using a laser-based measurement device. Pitch and roll (e.g., tilt) sensors, which are typically also on the vessel and which may be part of the jig or may be separate from the jig, are used to take pitch and roll measurements, respectively. The vertical height, pitch, and roll measurements are conveyed to a processor (generally separate from the jig and generally apart from the barge) that computes the height of each corner of the vessel based on the vertical height, pitch, and roll measurements and the measurements of the vessel, which may be obtained from an electronic database of vessel measurements. The heights of the corners of the vessel then can be conveyed to the operator, e.g., electronically via a wireless communication connection to an operator console such as a smartphone, tablet, computer, or other console. For purposes of the present invention, a "corner" of a vessel can be any point on the vessel and does not necessarily have to be an actual corner in the sense of a rectangular area. Among other things, the vessel load measurement system can reduce labor costs, increase the accuracy of measurements, and increase the frequency of measurements, which in turn can allow the vessel to be loaded more efficiently and to the optimal amount while better ensuring that the vessel is level.

Exemplary embodiments are described herein with reference to a barge loading environment for loading of a dry material into a barge, although it should be appreciated that the types of issues that arise in this barge loading environment also can arise with the loading of other types of materials and/or in other vessel loading environments and even in situations where the loading routine changes (e.g., when the vessel is stationary when loaded, or when using a different loading mechanism such as a precision loading crane). Therefore, it should be noted that the same or similar systems can be used or configured for use in other loading environments including water-based, air-based, and land-based vessels in which level and/or height information can be used as part of the loading process. The present invention is not limited to a barge loading environment or to loading of dry materials into a vessel.

Figure 1:
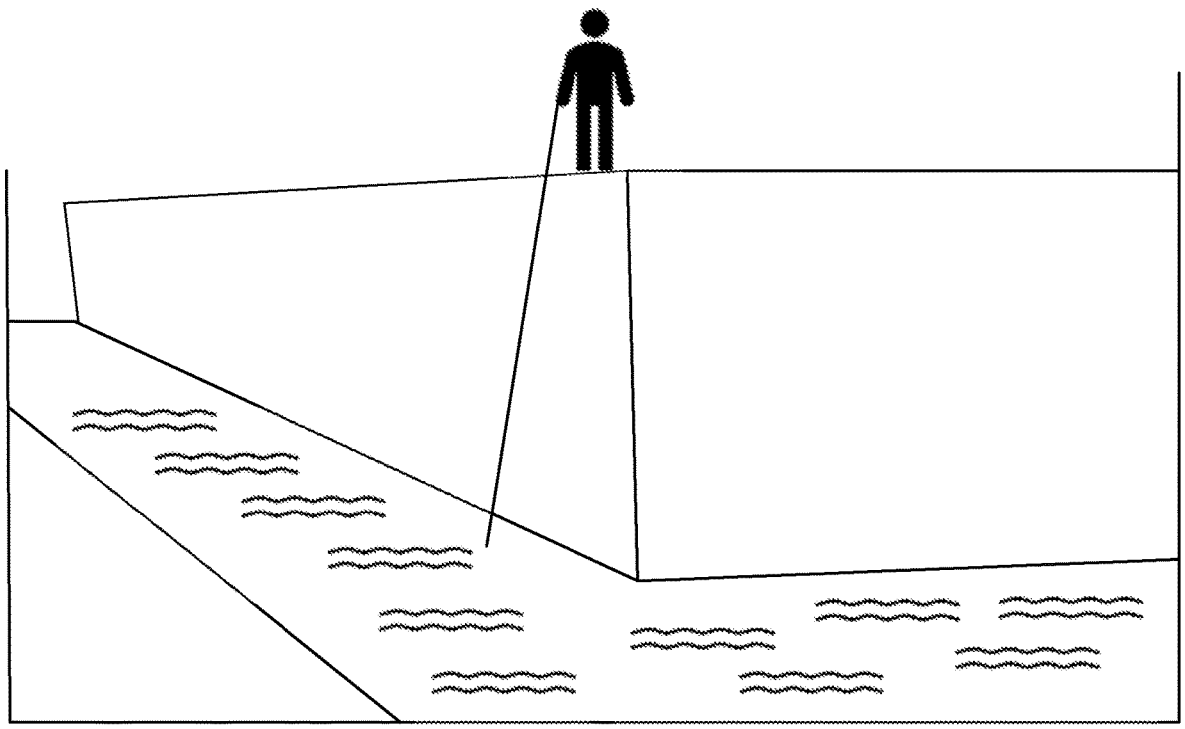
FIG. 1 is a photograph showing an example of making height measurements at a corner of a barge using a handheld measurement rod held over the side of the barge and lowered to the water level, as known in the art.
Figure 2:
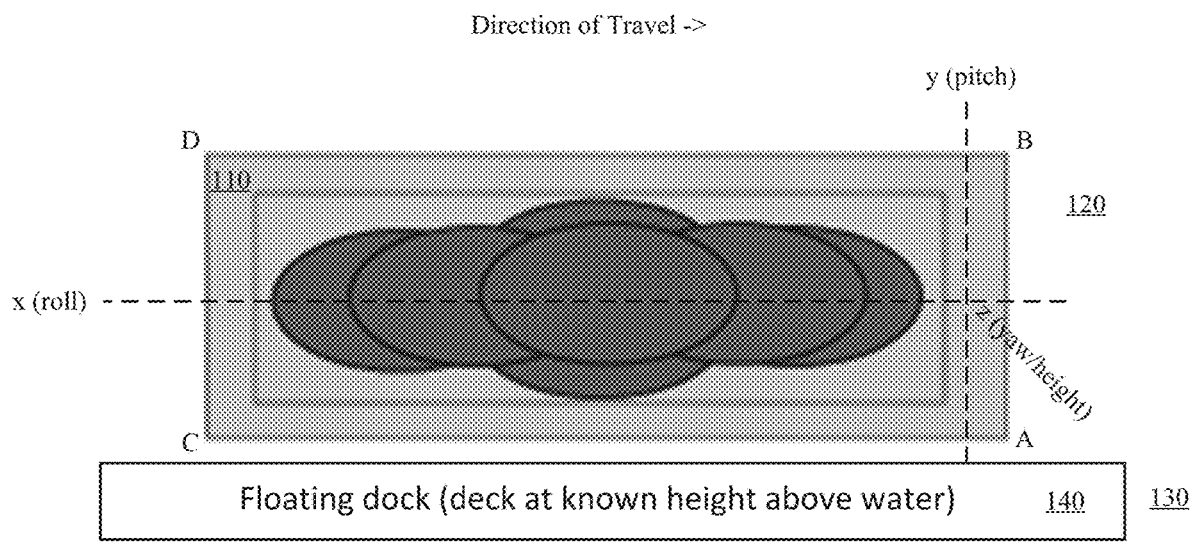
FIG. 2 is a schematic plan view of a floating dock and barge in accordance with one exemplary embodiment in which a jig is placed at the front of the barge.
Figure 3:
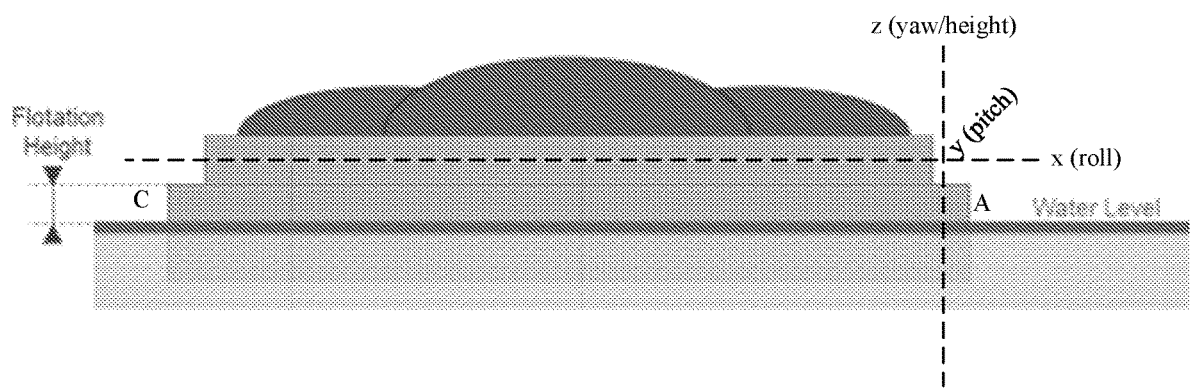
FIG. 3 is a schematic side profile view of the barge of FIG. 2.
Figure 4:
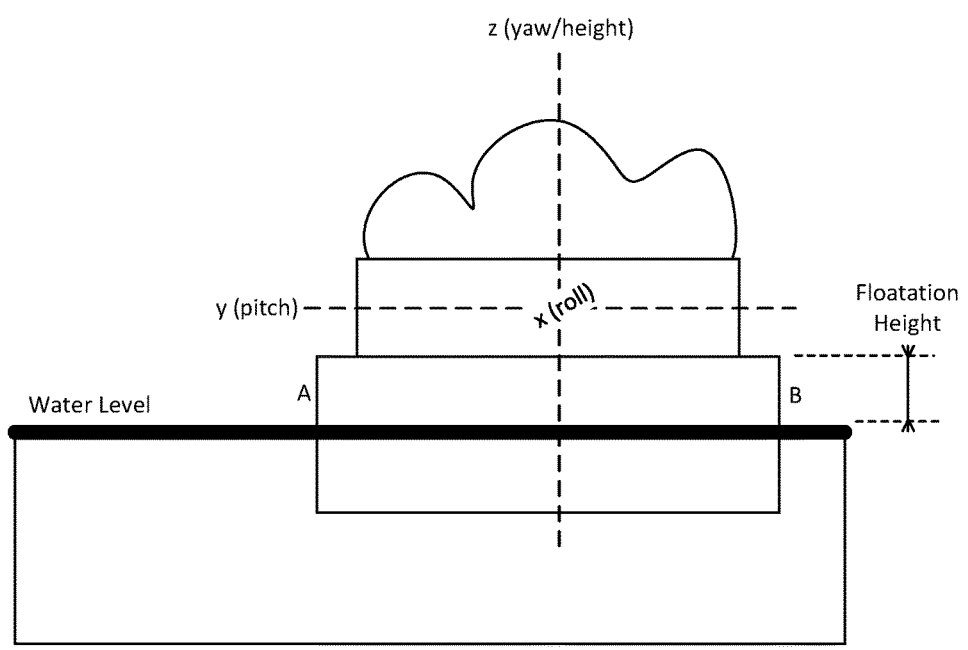
FIG. 4 is a schematic end profile view of the barge of FIG. 2.
Figure 5:
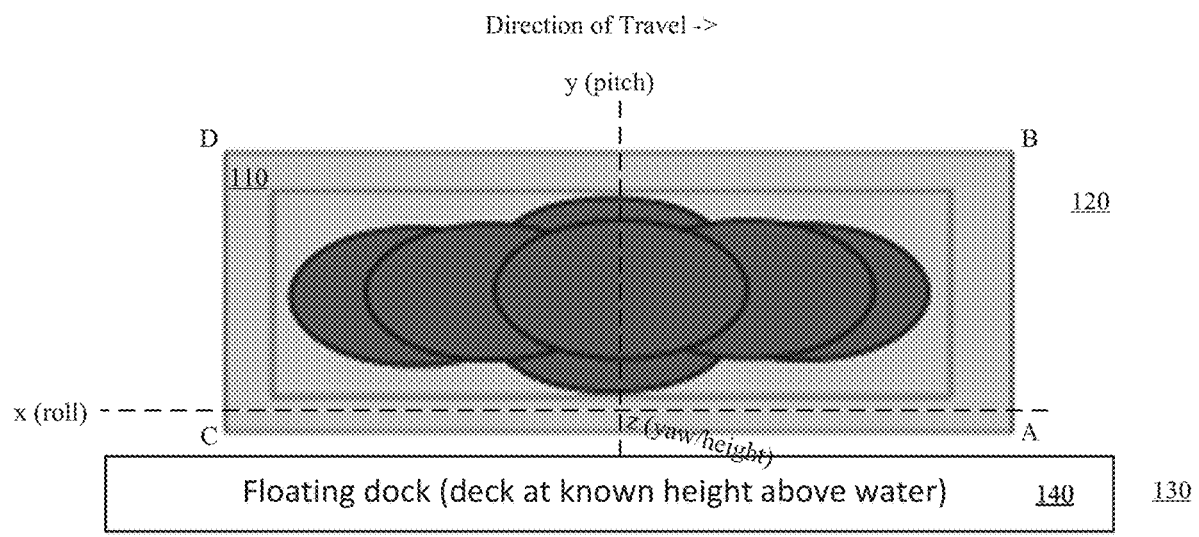
FIG. 5 is a schematic plan view of a floating dock and barge in accordance with another exemplary embodiment in which a jig is placed at the side of the barge.

FIGS. 2-5 show a barge loading environment 100 in accordance with certain exemplary embodiments, where FIG. 2 is a schematic diagram showing plan view of the barge loading environment, FIG. 3 is a schematic diagram showing a side profile view of the barge loading environment, and FIG. 4 is a schematic diagram showing an end profile view of the barge loading environment. Here, a barge 110 moves through a body of water 120 through a barge loading zone 130. In these examples, the direction of travel is from left to right in FIG. 2. The four corners of the barge 110 are labeled A-D. The barge 110 is depicted relative to three orthogonal axes that generally would be relative to the placement of the jig on the barge, which may be virtually anywhere on the barge. In FIGS. 2-4, the jig is placed at the front of the barge, but the jig could be place elsewhere, e.g., on the side of the barge facing the floating dock 130 as shown in FIG. 5. For purposes of the following discussion, the x axis represents a longitudinal roll axis, the y axis represents a pitch axis, and the z axis (which is normal to the plane of the x and y axes) represents both a yaw axis for any rotational displacement of the barge about the z axis and a vertical height axis for vertical displacement of the barge 110, e.g., due to water level and/or load. For example, an unbalanced load relative to the width of the barge 110 might cause some amount of roll about the x axis (e.g., corners B and D might be lower than corners A and C, respectively), or an unbalanced load relative to the length of the barge 110 might cause some amount of pitch about they axis (e.g., corners A and B might be lower than corners C and D, respectively). Typically, the loading zone 130 will include a dock or platform 140, such as a floating dock that is a known height above the water level or a stationary dock or platform, which, in certain exemplary embodiments, provides a reference for determining the water level.

Figure 6:
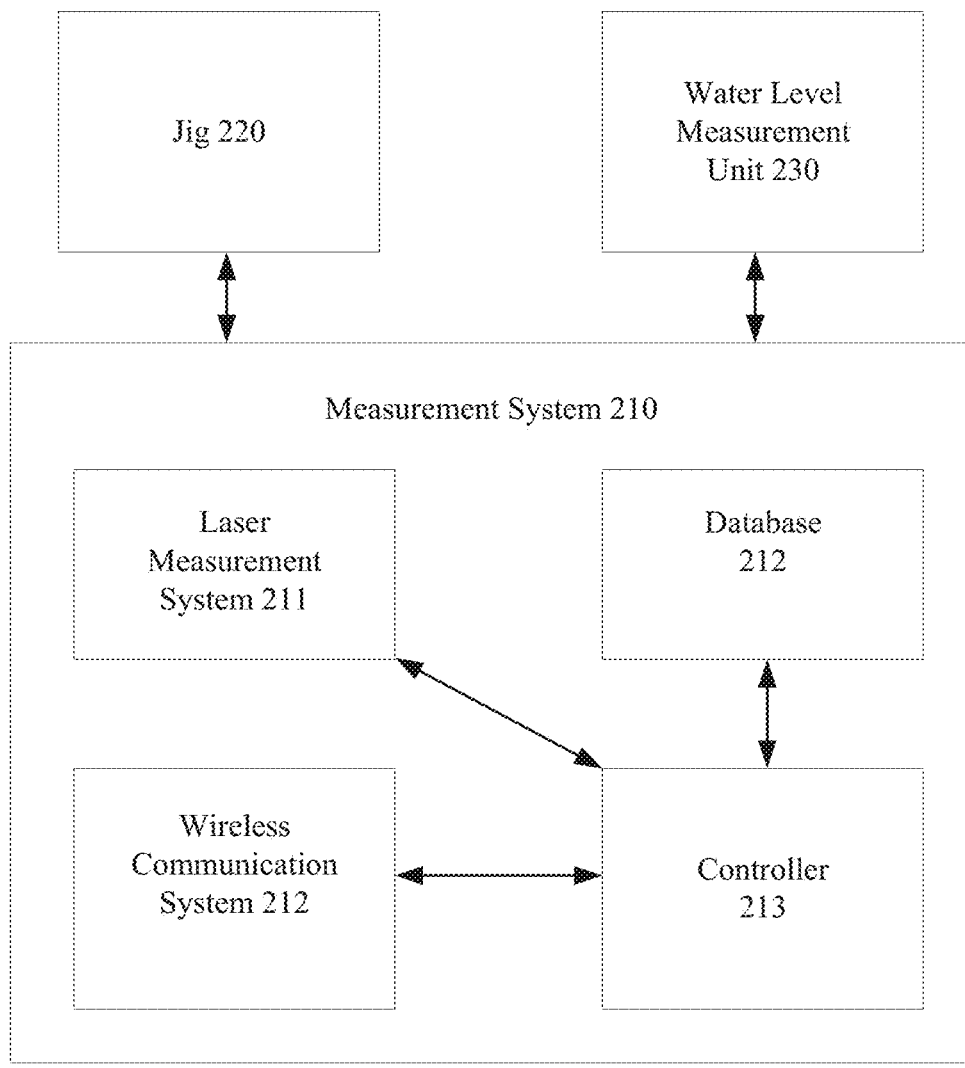
FIG. 6 is a schematic diagram showing a barge loading measurement system 200, in accordance with certain exemplary embodiments.

FIG. 6 is a schematic diagram showing a barge loading measurement system 200, in accordance with certain exemplary embodiments. Among other things, the barge loading measurement system 200 includes a measurement system 210, a jig 220, and optionally a water level measurement unit 230. The jig 220 is placed on the barge and is used to measure the height of a point on the barge as discussed below. When used, the water level measurement unit 230 is used to measure the height of the water level and can be placed on a floating dock or floating in the water. As discussed below, the measurement system 210 uses the jig 220 to measure the height of a known point on the barge above the water level and uses this height measurement along with barge roll and pitch measurements to compute the heights of the four corners of the barge above the water level. When used, the water level measurement unit 230 can be used to determine the height of the water level.

In this example, the measurement unit 210 includes a laser measurement system 211, a database 212, a controller 213, and a wireless communication system 214. These components can be part of a single device or can be part of two or more devices that operate in conjunction with one another. The components of the measurement system 210 are generally placed at a fixed location in or near the barge loading zone.

The laser measurement system 211 generally includes a laser that can be directed to a laser target (e.g., a prism or reflector) on the jig and, when the water level measurement unit 230 is used, also on the water level measurement unit 230, to measure the absolute or relative height(s) of the laser target(s). The database 220 is a tangible, non-transitory computer storage system in which specifications for various types of barges are stored (e.g., various dimensions of the barges). The controller can use the height measurement(s) along with the height of the water level (discussed below), the barge specifications obtained from the database 212 (e.g., based on a user input or barge identifier), and the barge roll and pitch measurements to compute the heights of the four corners of the barge above the water level, as discussed below. The wireless communication system 214 can be used by the controller 213 to convey the corner heights to an operator and also can be used to receive barge pitch and roll measurements from the jig 220 or other sensors.

When the water level measurement unit 230 is used, the controller 213 controls the laser measurement system 211 to measure the absolute or relative height of the laser target of the water level measurement unit 230 (which is a known height above the base of the water level measurement unit 230) and computes therefrom the absolute or relative height of the water level. For example, if the water level measurement unit 230 is placed on a floating dock that is a known height above the water level, then the controller 213 can compute the height of the water level based on the measured height of the laser target of the water level measurement unit 230 and the known height of the floating dock above the water level (e.g., by adding the known height of the floating dock and the known height of the laser target). For another example, if the water level measurement unit 230 is floating in the water such that the laser target is a known height above the water level, then the controller 213 can compute the height of the water level based on the measured height of the laser target of the water level measurement unit 230. For embodiments in which no water level measurement unit 230 is used, the controller 213 can obtain or determine the height of the water level in other ways. For example, the water level can be manually entered into the controller, the water level can be computed based on tidal reports, or the controller 213 can determine the height of the water level from the measured height of the jig (discussed below) when the barge is empty.

In any case, the jig 220 includes a passive laser target (e.g., a prism or reflector) that is at a known location on the jig 220. The jig 220 is placed on the barge at a known location that may be different on different types of barges. Because of the different dimensions of different barges, the jig may be at different heights on different types of barges.

The controller 213 controls the laser measurement system 211 to measure the absolute or relative height of the laser target of the jig 220. Because the jig 220 is placed at a known location on the barge, the controller 213 can use the absolute or relative height of the laser target as measured using the laser measurement system 211, along with the known location of the laser target on the jig 220, the specifications of the barge as obtained from the database 212, and the height of the water level as determined using the water level measurement unit 230 or otherwise, to determine the height of the laser target above the water level.

In certain exemplary embodiments, the jig 220 also includes tilt sensors for measuring roll and pitch of the barge and a communication system for conveying the roll and pitch measurements to the measurement system 210, although it should be noted that the pitch sensors can be separate from the jig 220 in other embodiments, and in some embodiments, roll and pitch of the barge can be measured in other ways, e.g., by the laser measurement system 211.

As mentioned above, the controller 213 computes the barge corner heights based on the height of the laser target on the jig 220 and the barge roll and pitch measurements. For example, based on the height of the laser target, the controller 213 can determine the nominal heights of the barge corners when the barge is perfectly level and can determine the deviation of each barge corner from the nominal height based on the roll and pitch measurements and the barge dimensions.

It should be noted that the jig can be configured to be easily moved from one barge to another. For example, the jig may be configured as a portable unit with its own power supply and communication system (e.g., inside a waterproof/weatherproof box). The jig may have a notch, lip, or other alignment feature to help with alignment of the jig on the barge (e.g., along an edge of the barge). The jig may have feet to facilitate placement on the barge even when there is dirt or debris on the barge surface. Preferably, the jig is configured to place the laser target at a precisely known position and height and also, when the jig includes tilt sensors, to place the tilt sensors precisely along the roll and pitch axes. Alternatively, the jig can be configured to be permanently or semi-permanently mounted to the barge such that, for example, each barge can include a jig without having to move a jig from barge to barge. It should be noted that separate jigs could be used for the laser target (e.g., too allow for placement at a precise location accessible by the laser) and for the tilt sensors (e.g., to allow for placement with precise alignment to the roll and pitch axes, not necessarily accessible to the laser).

The following describes one specific exemplary embodiment.

Figure 7:
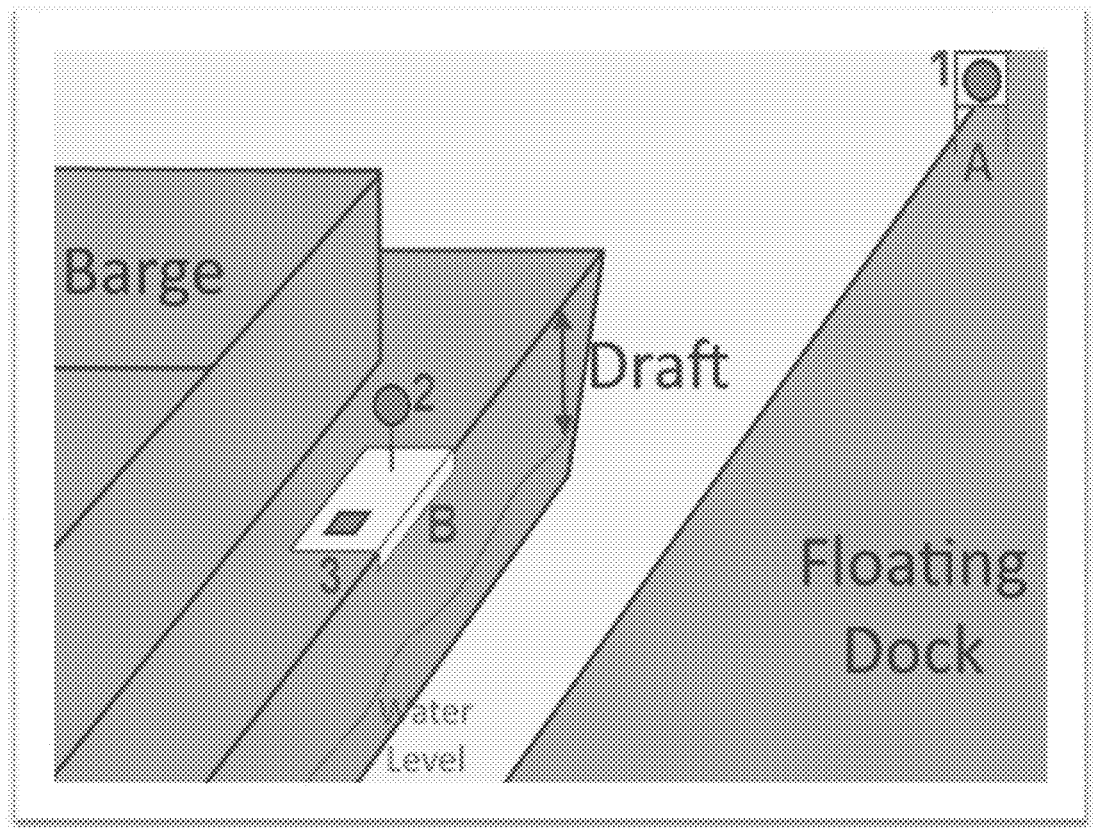
FIG. 7 is a schematic diagram showing the relative placement of the jig and the water level measurement unit, in accordance with one exemplary embodiment.

FIG. 7 is a schematic diagram showing the relative placement of the jig and the water level measurement unit, in accordance with one exemplary embodiment. Here, the water level measurement unit with laser target 1 is placed at location A on the floating dock, while the jig with laser target 2 and tilt sensors 3 are placed at location B on the barge.

Figure 8:
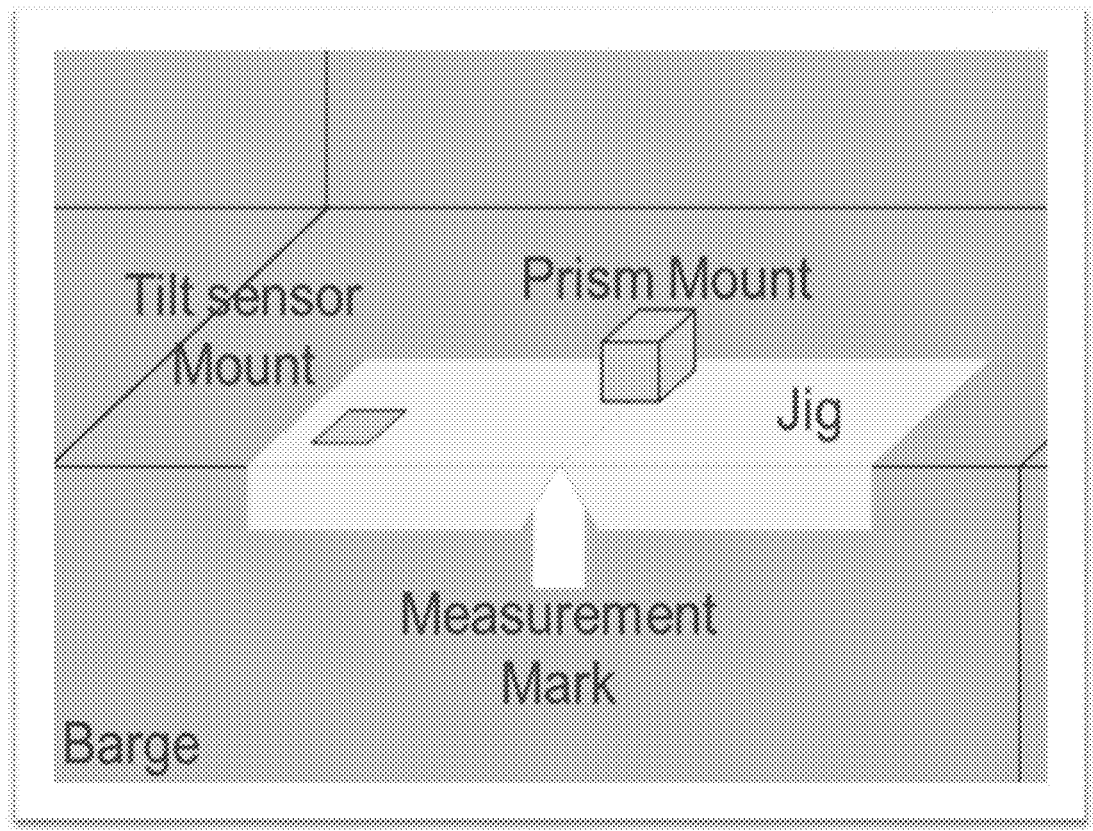
FIG. 8 is a schematic diagram showing the configuration of the jig, in accordance with one exemplary embodiment.

FIG. 8 is a schematic diagram showing the configuration of the jig, in accordance with one exemplary embodiment. Here the jig includes a notch to assist with alignment with a measurement mark on the barge, which may be a visual marker or physical marker that interfaces with the notch.

Figure 9:
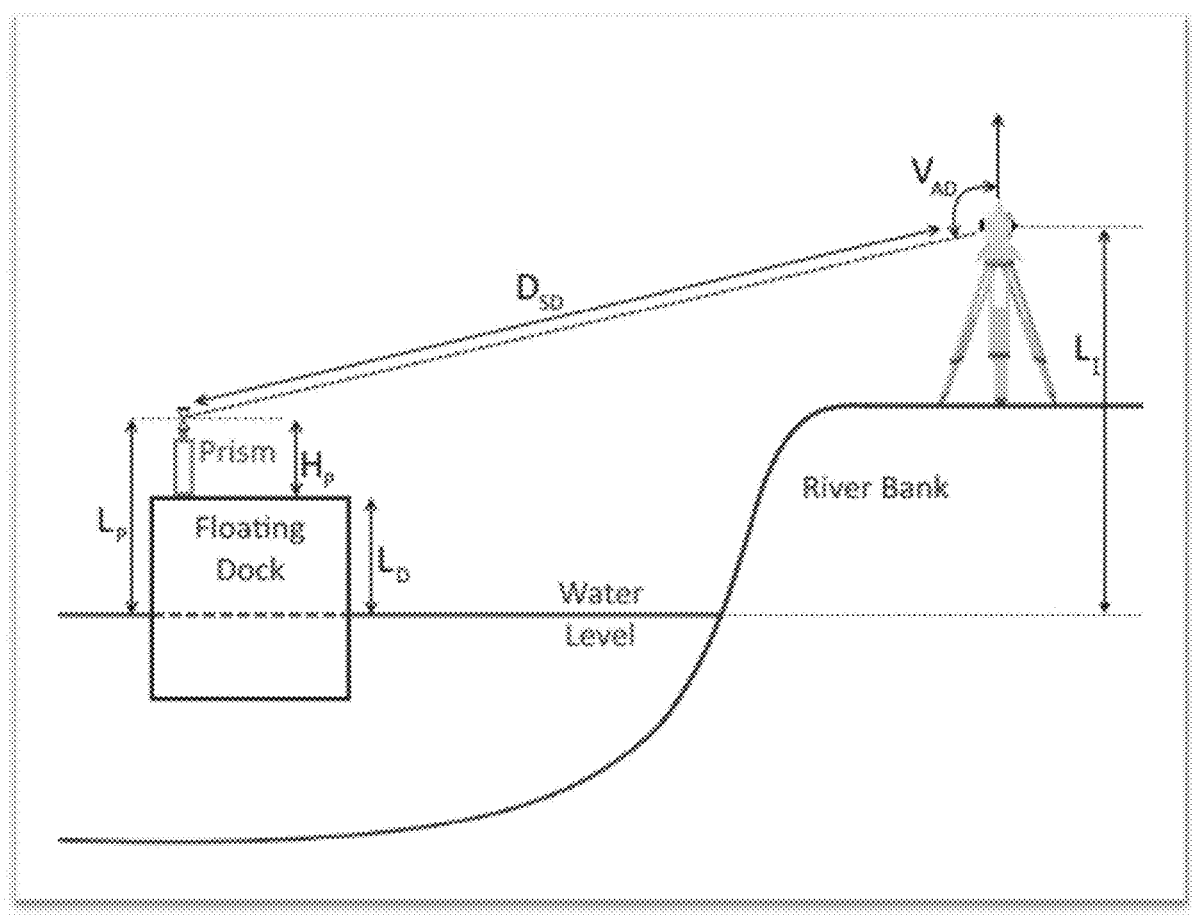
FIG. 9 is a schematic diagram for calibration of the water level, in accordance with one exemplary embodiment.

FIG. 9 is a schematic diagram for calibration of the water level, in accordance with one exemplary embodiment. Here, the laser measurement system is placed in a stable and level location that is not on the floating dock and is not affected by changes in water level, e.g., on the river bank. The deck of the floating dock is a known distance above the water level, $L_D$. The laser target (prism) on the water level measurement unit on the floating dock is a known height above the dock's deck, $H_P$. The values $L_D$ and $H_P$ generally will be entered into the controller 213 configuration settings. The controller 213 then uses the laser measurement system to measure the zenith angle from the laser measurement system to the prism on the floating dock, $V_{AD}$, and the slope distance between the laser measurement system and the center of the prism, $D_{SD}$. From these measurements, the controller 213 computes the height above water level of the prism on the floating dock, $L_P$, and the height above water level of the center of the laser measurement system, $L_I$, where:

$LP=LD+HP$; and $LI=LP+(DSD\times[\sin\{VAD-90\}])$.

Figure 10:
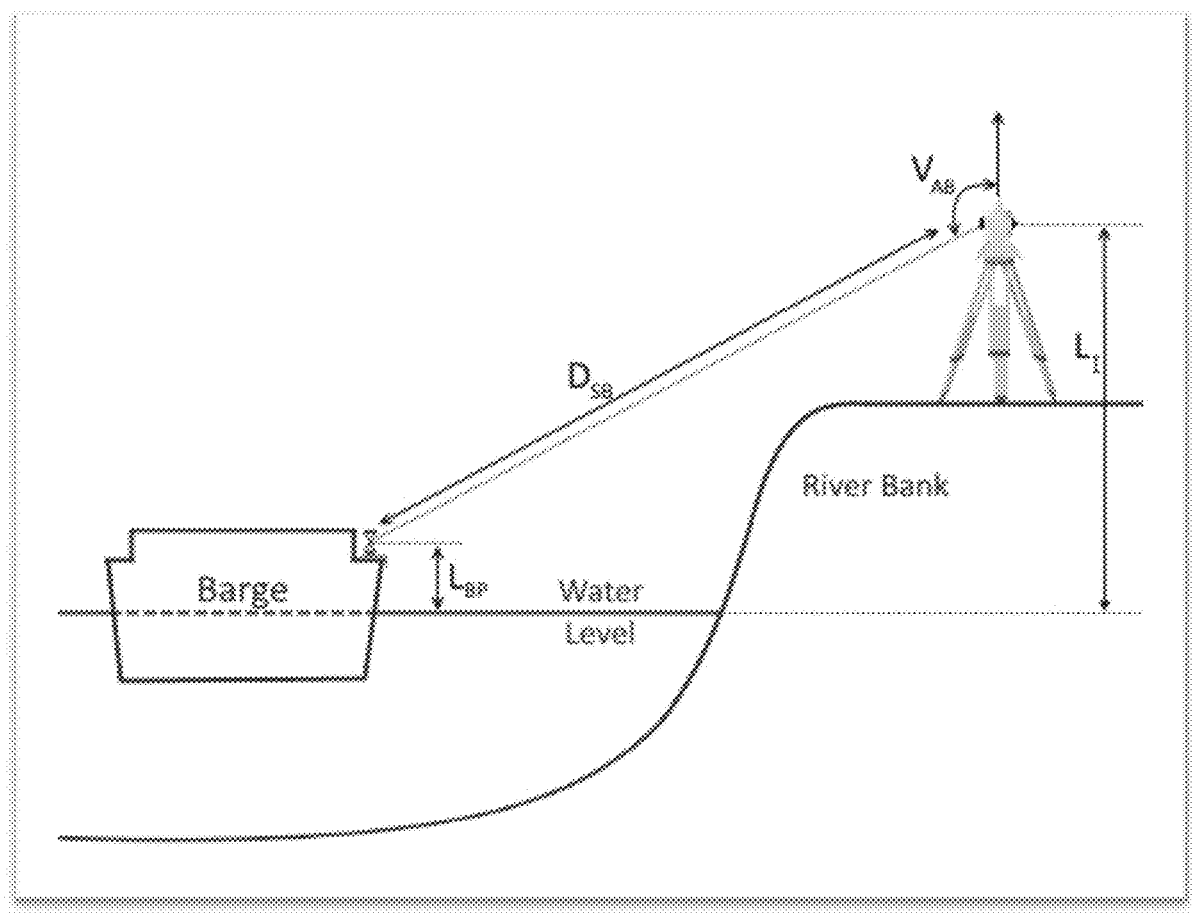
FIG. 10 is a schematic diagram for computing height of the laser target on the jig, in accordance with one exemplary embodiment.

FIG. 10 is a schematic diagram for computing height above water of the laser target on the jig, in accordance with one exemplary embodiment. Here, the controller 213 uses the laser measurement system to measure the zenith angle from the laser measurement unit to the prism on the barge, $V_{AB}$, and the slope distance between the laser measurement unit and the prism, $D_{SB}$. The controller 213 then uses the height above water level of the laser measurement system, $L_I$, to compute the height above water level of the prism on the barge, $L_{BP}$, as follows:

$LBP=LI-(DSB\times[\sin\{VAB-90\}])$.

Figure 11:
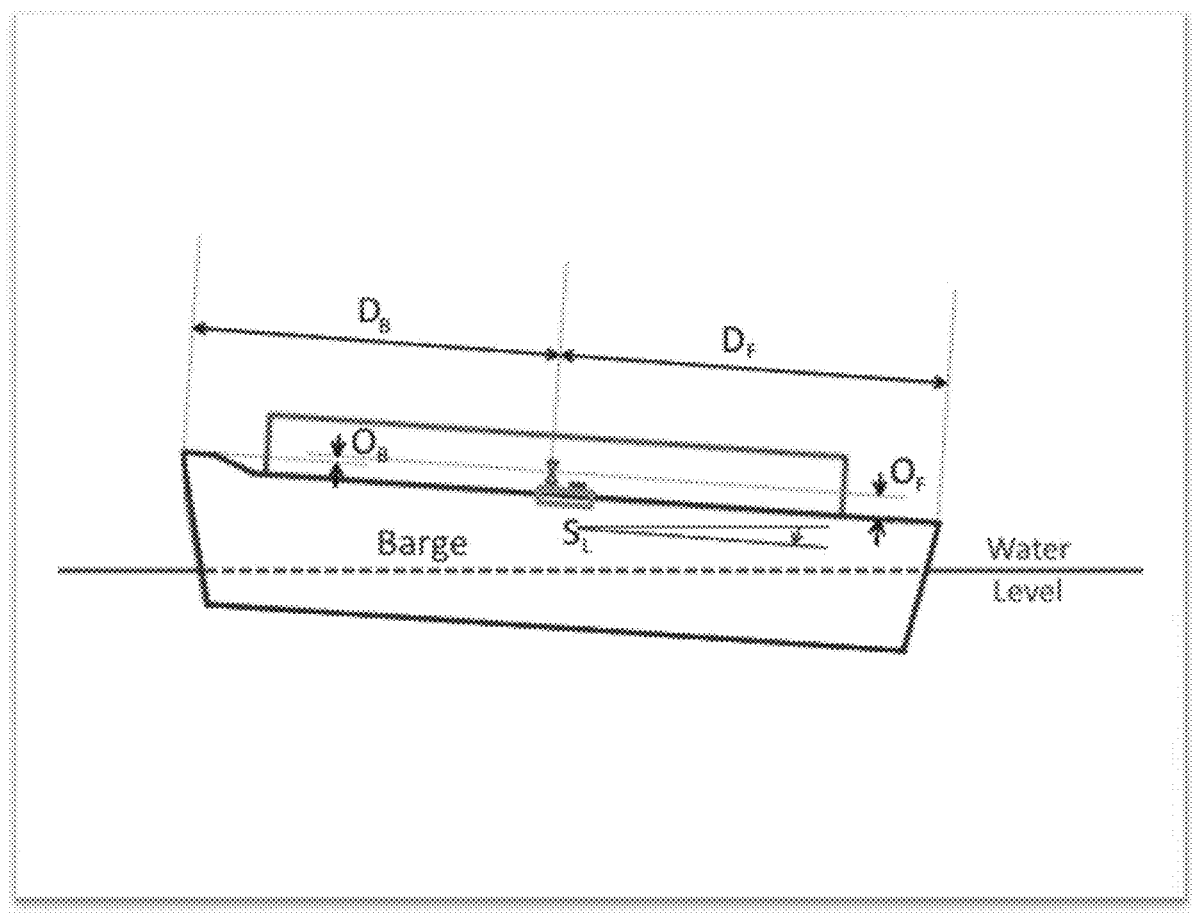
FIG. 11 is a schematic diagram for computing the height differences at the corners of the barge based on the pitch of the barge, in accordance with one exemplary embodiment.

FIG. 11 is a schematic diagram for computing the height differences at the corners of the barge based on the pitch of the barge, in accordance with one exemplary embodiment. Here, the controller 213 calculates the height differences between the back and front of the barge, and the barge's prism, using the tilt reading along the barge's length to dictate the barge slope, $S_L$ (in this example, positive values are given when the barge front raises), the known horizontal distance from the prism to the barge front, $D_F$, the known horizontal distance from the prism to the barge back, $D_B$, the known vertical offset between the prism and the barge front, $O_F$ (positive means the front is above the prism, when the barge is level), and the known vertical offset between the prism and the barge back, $O_B$ (positive means the back is above the prism, when the barge is level). The height difference along the length of the barge between the prism point and the barge back ($H_B$) and the barge front ($H_F$) are made of two components, the height differences from the tilt ($H_{TB}$ & $H_{TF}$) and from the offset ($H_{OB}$ & $H_{OF}$).

The computation for the back of the barge is:

$HB=HTB+HOB$ where:

$HTB=-DB\times\sin SL$; and $HOB=OB\times\cos SL$.

The computation for the front of the barge is:

$HF=HTF+HOF$ where:

$HTF=DF\times\sin SL$; and $HOF=OF\times\cos SL$.

Figure 12:
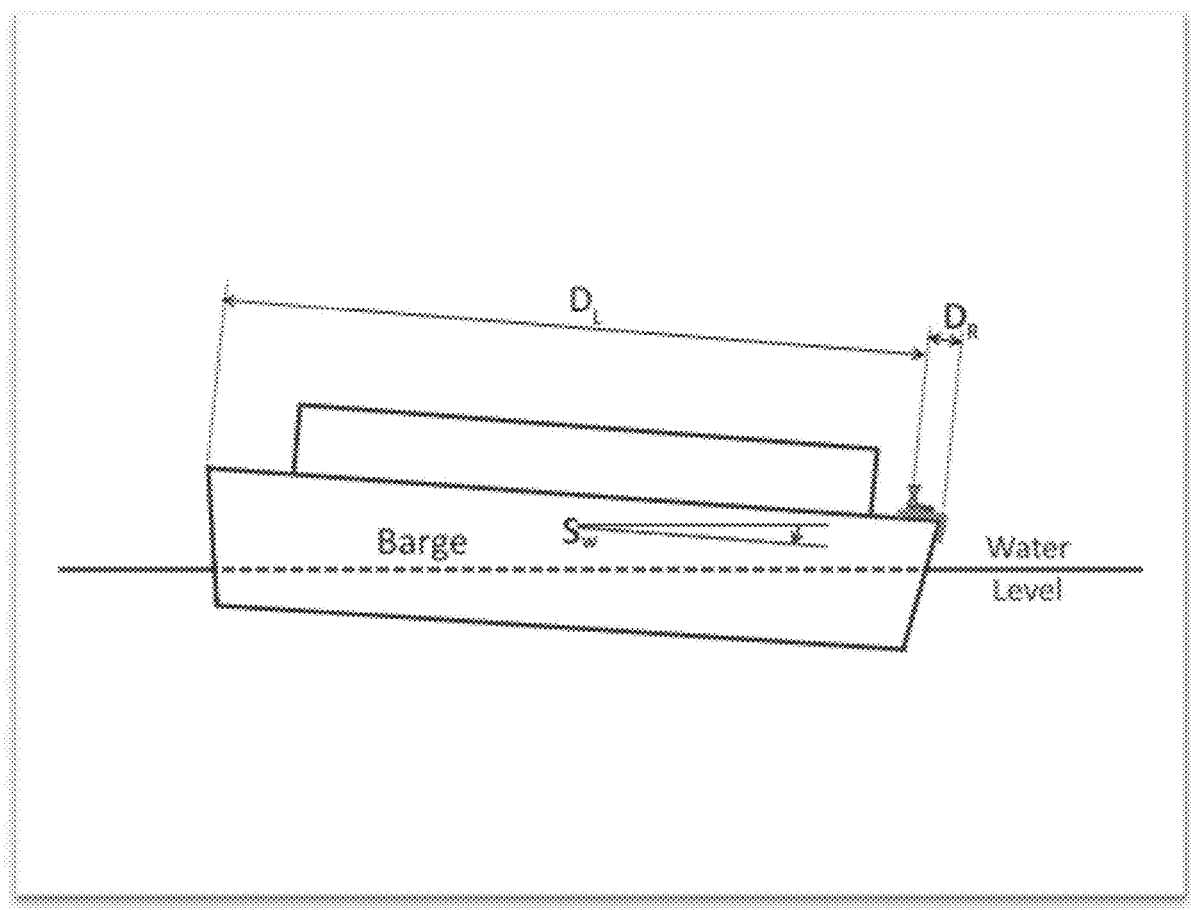
FIG. 12 is a schematic diagram for computing the height differences at the corners of the barge based on the roll of the barge, in accordance with one exemplary embodiment.

FIG. 12 is a schematic diagram for computing the height differences at the corners of the barge based on the roll of the barge, in accordance with one exemplary embodiment. Here, the controller 213 calculates the height differences between the right and left sides of the barge, and the barge's prism, using the tilt reading across the barge's width to dictate the barge slope, $S_W$ (positive values are given when the barge's right hand side raises), the known horizontal distance from prism to the barge's right side, $D_R$, and the known horizontal distance from prism to the barge's left side, $D_L$. The height difference along the length of the barge between the prism point and the barge's right edge ($H_R$) and the barge's left edge ($H_L$) can then be computed as follows:

$HR=DR\times\sin SW$; and $HL=-DL\times\sin SW$.

Figure 13:
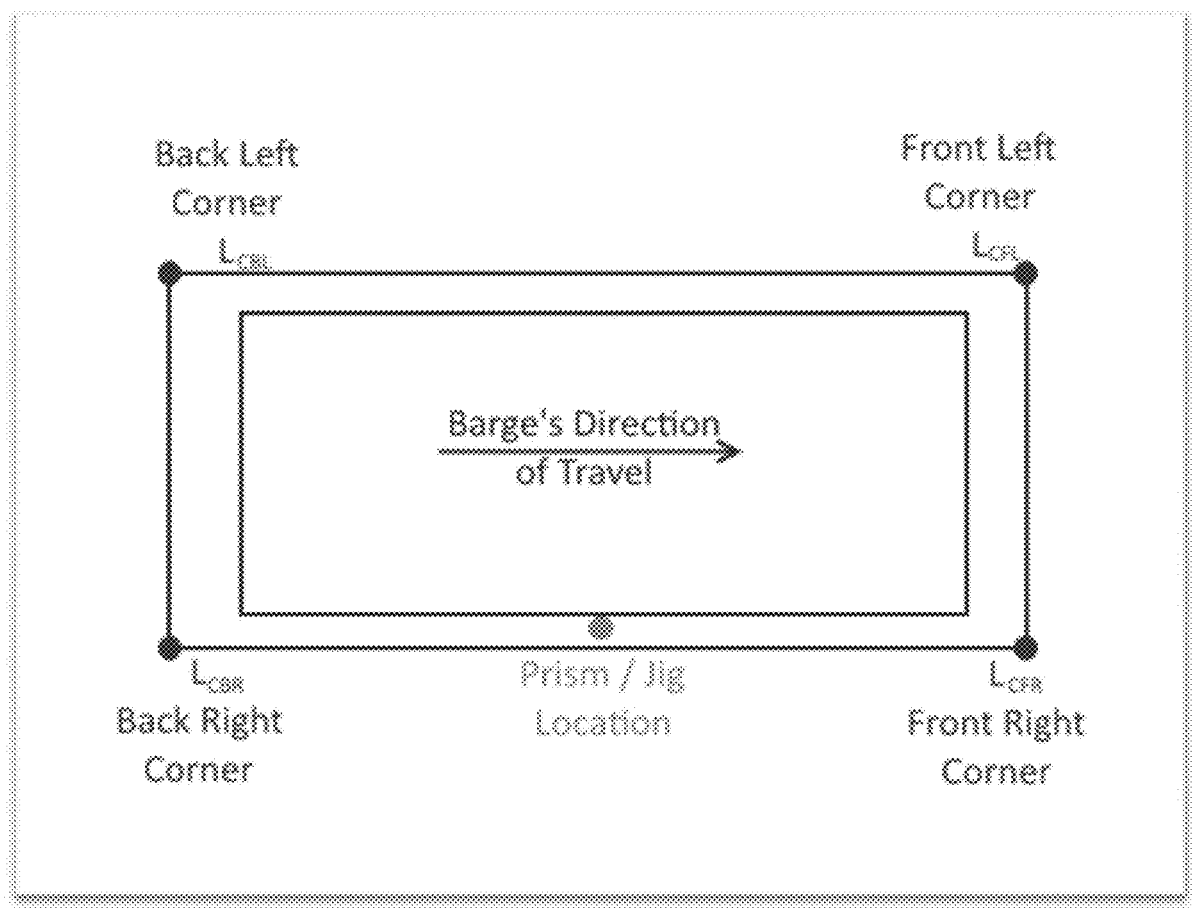
FIG. 13 is a schematic diagram for computing the final heights of the barge corners, in accordance with one exemplary embodiment.

FIG. 13 is a schematic diagram for computing the final heights of the barge corners, in accordance with one exemplary embodiment. Here, the controller 213 combines all of the measurements, readings, and intermediate computations to compute the height above water level at all four corners of the barge, as follows:

$$LCFR = LBP + HF + HR;$$

$$LCFL = LBP + HF + HL;$$

$$LCBL = LBP + HB + HL; \text{ and}$$

$$LCBR = LBP + HB + HR.$$

Once the controller 213 has computed the barge corner heights, the controller 213 can then transmit the barge corner heights to the operator, e.g., using the wireless communication system 214. In this regard, the operator may be provided with an operator terminal (not shown) for receiving and displaying the barge corner heights, e.g., via a graphical user interface configured to display a representation of the barge along with the barge corner heights (e.g., the display may be similar to that shown in FIG. 13 but with the actual barge corner heights shown at the corners).

Furthermore, the various measurements, readings, and computations may be repeated and updated frequently, e.g., every second or multiple times a second. In this way, the operator can be provided with updated barge corner heights substantially in real-time so that more accurate loading of the barge is possible.

The portable computing device may be configured to allow the operator to provide relevant information to the controller 213, such as, for example, the type of barge being loaded (e.g., from which the controller 213 can access the database 212 to obtain the barge dimensions), or any of the fixed values used in the computations (e.g., the known height of the floating dock above the water level or the height of the laser target on the water level measurement unit). Additionally or alternatively, such information could be entered in the controller 213 through a separate operator console associated with the controller 213.

In certain specific exemplary embodiments, the laser measurement system and controller is a Leica Geosystems Total Station or Multi Station instrument (e.g., Nova MS60 Multi Station) running a barge measurement application configured to implement the described measurements and computations. Embodiments of the present invention can be operated on other types of laser-based instruments or in conjunction with other types of laser-based instruments.

Figure 14:
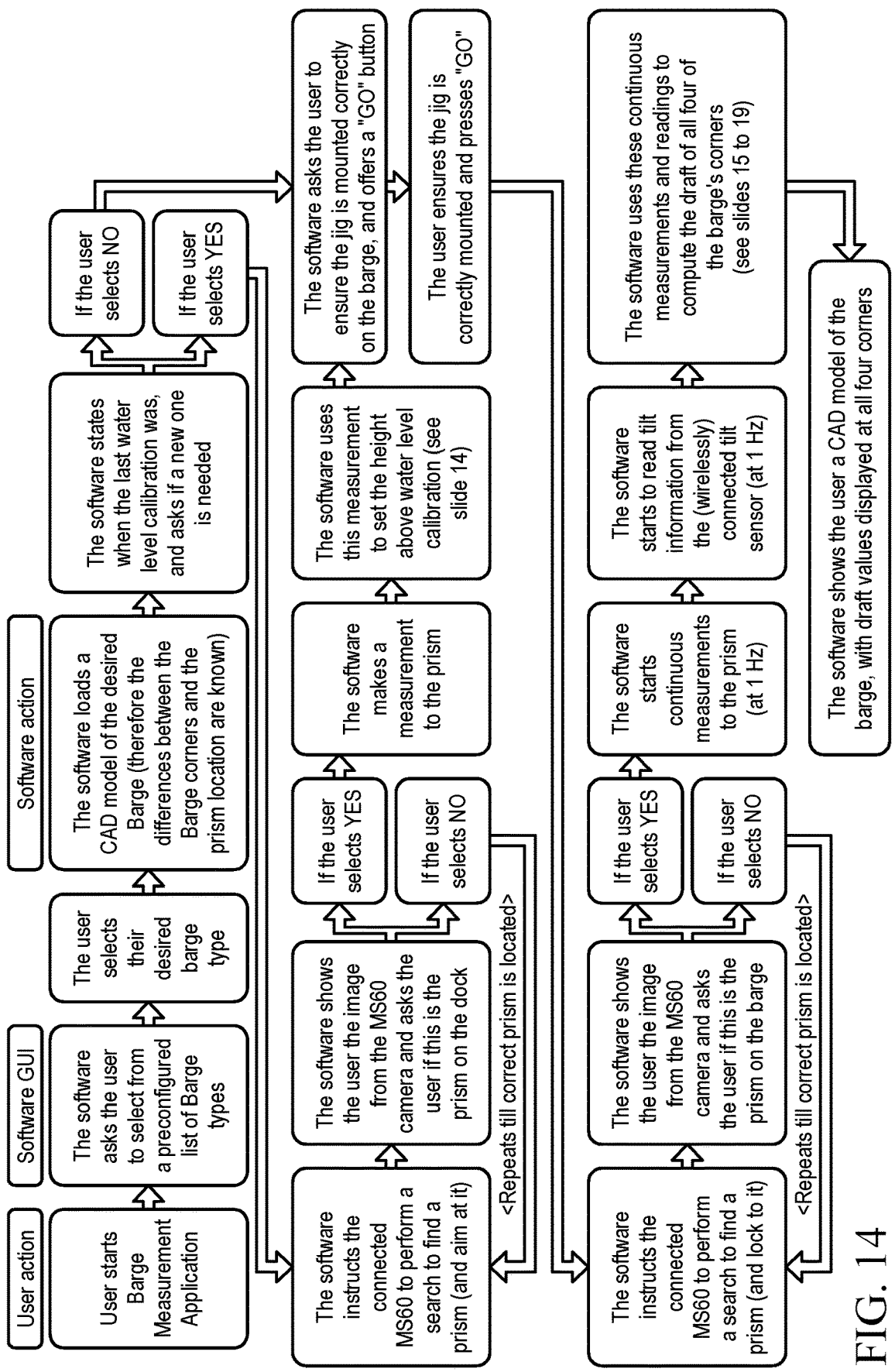
FIG. 14 is a high-level logic flow diagram for performing the measurements and computations described above, in accordance with one exemplary embodiment.

FIG. 14 is a high-level logic flow diagram for performing the measurements and computations described above, in accordance with one exemplary embodiment. Here, the user starts the barge measurement application (run by the controller 213). The barge measurement application presents a graphical user interface to the user and asks the user to select the barge type from a preconfigured list of barge types. Upon selection of the desired barge type by the user, the barge measurement application loads a CAD model of the barge from the database 212, which provides the barge measurement application with relevant barge dimensions and the jig location.

The barge measurement application then presents to the user the last time the water level was measured/calibrated and asks the user if a new calibration is needed. If a new calibration is needed, then the barge measurement application instructs the laser measurement device to perform a search to find a prism and aim at it, shows the user an image from the laser measurement device, and asks the user if the displayed prism is the prism on the floating dock. If it is not the prism on the dock, then the barge measurement application repeats this prism identification process until the appropriate prism is located. The barge measurement application make a measurement to the prism and uses the measurement to set the height above water level calibration.

The barge measurement application then asks the user to ensure that the jig is mounted to the barge. Once the user confirms that the jig is mounted to the barge, the barge measurement application instructs the laser measurement device to find the prism on the jig, shows the user an image from the laser measurement device, and asks the user if the prism is the prism on the jig. If it is not the prism on the jig, then the barge measurement application repeats this prism identification process until the appropriate prism is located. The barge measurement application then begins making measurements using the prism, reading tilt information from the tilt sensors, computes the barge corner heights, and provides the barge corner heights to the operator.

It should be noted that the measurements and computations described with reference to FIGS. 7-14 illustrate one of many ways that the barge corner heights can be computed based the height of the laser target on the jig and the tilt measurements, while remaining within the scope of the presently claimed invention.

As one possible alternative, many CAD systems can compute points on a plane based on roll, pitch, and yaw rotational coordinates, e.g., using computations known as Euler angles. A plane that passes through one or more of the barge corners and is parallel to the plane of the barge at its level position can be defined. This plane will be a certain distance from the height of the laser target on the jig along the z-axis (i.e., the yaw and height axis), which will pass through the plane at a point P. The distance and direction from the point P to barge corner on the plane can be computed by the CAD system. The three-dimensional coordinates of the barge corner(s) on the plane then can be computed based on the distance of the plane from the height of the laser target on the jig (which in some cases may be zero), the point P, the distance and direction from the point P to each barge corner on the plane, and the three Euler angles. In exemplary embodiments, the computation may be simplified by ignoring the yaw angle, i.e., setting the yaw angle to zero, because the barge corner heights generally will not depend on the yaw angle of the barge. If all four barge corners are co-planar in the coordinate system, then all four barge corner heights can be computed based on a single plane; otherwise, multiple computations using multiple planes may need to be performed. Once the coordinates for the four barge corners are computed, the coordinates can be used to compute the height of each barge corner above the water level.

As another possible alternative, a laser target may be placed at each of the barge corners by which the controller 213 can directly measure the height of each barge corner relative to the water level.

Thus, exemplary embodiments utilize a laser-based height measurement of a laser target placed on the barge, along with barge roll and pitch angles, to compute barge corner heights.

As mentioned above, vessels are used to transport a wide variety of products and materials and often suffer from the same or similar issues as barges. For example, loading a truck or trailer unevenly could create a tipping or braking hazard, so embodiments of the invention can be configured to determine corner height(s) of a truck or trailer or other such vehicle. Similarly, loading an airplane unevenly could create a flight hazard, so embodiments of the invention can be configured to determine corner height(s) of an airplane, e.g., at the wing tips. Similar issues may exist when transporting fluids rather than solids. For example, a vessel may include compartments or tanks that need to be filled with fluids to ensure a balanced and level load, and embodiments of the invention can be configured for use in such applications. It should be noted that embodiments of the invention are not limited to transportation of products and materials but also could be applied to other loading situations, such as, for example, loading of passengers onto a vessel such as a ferry, barge, boat, ship, airplane, or other vessel.

The barge measurement application that runs on the controller 213 may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A vessel load measurement system comprising:
an operator terminal;
a laser measurement system comprising a laser that directs to one or more remote laser targets to measure distances and angles;
a first laser target for placement at a known location on a vessel; at least one tilt sensor for measuring pitch and roll of the vessel; and
a controller having at least one processor and at least one memory containing computer instructions which, when executed by the at least one processor, cause the controller to make a plurality of measurements as the vessel is being loaded, wherein, for each measurement, the controller uses the laser measurement system to measure a height of the first laser target on the vessel; computes at least one vessel corner height based on the measured height of the first laser target at the known location on the vessel, the pitch and roll measurements, and known dimensions of the vessel; and
transmits the at least one vessel corner height to the operator terminal;
the operator terminal producing a graphical user interface on a display in communication with the operator terminal, the graphical user interface including representations of the vessel and at least one vessel corner height, the representations of the at least one vessel corner height dynamically updated substantially in real-time based on the at least one vessel corner height from each of the plurality of measurements transmitted by the controller to the operator terminal to provide real-time monitoring of vessel loading from the operator terminal.

2. The vessel load measurement system of claim 1, wherein the controller computes the at least one vessel corner height relative to a level of water in which the vessel floats.

3. The vessel load measurement system of claim 2, further comprising a second laser target for placement on a surface that changes height based on the level of water, wherein the controller is uses the laser measurement system to measure a height of the second laser target based on distance and angle measurements provided by the laser measurement system and determines the level of water level based on the measured height of the second laser target.

4. The vessel load measurement system of claim 3, wherein the surface is a floating dock that is a known height above the level of water and wherein the second laser target is a known height above the floating dock.

5. The vessel load measurement system of claim 3, wherein the surface is the water.

6. The vessel load measurement system of claim 1, wherein the first laser target and the at least one tilt sensor are part of a jig that is configured to be placed at a known location on the vessel.

7. The vessel load measurement system of claim 1, further comprising a database of vessel dimensions for different vessel types, wherein the controller obtains the known dimensions of the vessel from the database.

8. The vessel load measurement system of claim 1, wherein the graphical user interface of the operator terminal allows a user of the operator terminal to select a vessel type from a preconfigured list of vessel types, and wherein the controller obtains the known dimensions of the vessel based on the selected vessel type.

9. A vessel load measurement system comprising:
an operator terminal;
a laser measurement system comprising a laser that directs to one or more remote laser targets to measure distances and angles; and
a controller having at least one processor and at least one memory containing computer instructions which, when executed by the at least one processor, cause the controller to make a plurality of measurements as the vessel is being loaded, wherein, for each measurement, the controller uses the laser measurement system to measure a height of a first laser target placed at a known location on a vessel, obtains pitch and roll measurements of the vessel, computes at least one vessel corner height based on the measured height of the first laser target at the known location on the vessel, the pitch and roll measurements of the vessel, and known dimensions of the vessel, and transmits the at least one vessel corner height to the operator terminal;
the operator terminal producing a graphical user interface on a display in communication with the operator terminal, the graphical user interface including representations of the vessel and at least one vessel corner height, the representations of the at least one vessel corner height dynamically updated substantially in real-time based on the at least one vessel corner height from each of the plurality of measurements transmitted by the controller to the operator terminal to provide real-time monitoring of vessel loading from the operator terminal.

10. The vessel load measurement system of claim 9, wherein the controller computes the at least one vessel corner height relative to a level of water in which the vessel floats.

11. The vessel load measurement system of claim 10, wherein the controller uses the laser measurement system to measure a height of a second laser target placed on a surface that changes height based on the level of water based on distance and angle measurements provided by the laser measurement controller and determines the level of water based on the measured height of the second laser target.

12. The vessel load measurement system of claim 11, wherein the surface is a floating dock that is a known height above the level of water and wherein the second laser target is a known height above the floating dock.

13. The vessel load measurement system of claim 11, wherein the surface is the water.

14. The vessel load measurement system of claim 9, wherein the controller receives the pitch and roll measurements from at least one tilt sensor on the vessel.

15. The vessel load measurement system of claim 9, further comprising a database of vessel dimensions for different vessel types, wherein the controller obtains the known dimensions of the vessel from the database.

16. The vessel load measurement system of claim 9, wherein the graphical user interface of the operator terminal allows a user of the operator terminal to select a vessel type from a preconfigured list of vessel types, and wherein the controller obtains the known dimensions of the vessel based on the selected vessel type.

17. A vessel load measurement method comprising:
making a plurality of measurements as a vessel is being loaded, wherein each measurement includes (a) controlling a laser measurement system to direct a laser of the laser measurement system onto a first laser target placed at a known location on the vessel to measure a height of the first laser target at the known location on the vessel, (b) obtaining pitch and roll measurements of the vessel, and (c) computing at least one vessel corner height based on the measured height of the first laser target at the known location on the vessel, the pitch and roll measurements of the vessel, and known dimensions of the vessel; and
producing, by an operator terminal, a graphical user interface on a display in communication with the operator terminal, the graphical user interface including representations of the vessel and at least one vessel corner height, the representations of the at least one vessel corner height dynamically updated substantially in real-time based on the at least one vessel corner height from each of the plurality of the plurality of measurements to provide real-time monitoring of vessel loading from the operator terminal.

18. The method of claim 17, wherein the at least one vessel corner height is computed relative to a level of water in which the vessel floats.

19. The method of claim 18, further comprising:
controlling the laser measurement system to direct the laser onto a second laser target placed on a surface that changes height based on the level of water to provide second distance and height measurements, measuring a height of the second laser target based on the second distance and height measurements, and determining the level of water based on the measured height of the second laser target.

20. The method of claim 19, wherein one of:
the surface is a floating dock that is a known height above the level of water and the second laser target is a known height above the floating dock; or the surface is the water.

* * * * *

UNITED STATES PATENT AND TRADEMARK OFFICE
CERTIFICATE OF CORRECTION

PATENT NO. : 11,725,930 B2
APPLICATION NO. : 16/279510
DATED : August 15, 2023
INVENTOR(S) : Richard Ostridge et al.

Page 1 of 1

It is certified that error appears in the above-identified patent and that said Letters Patent is hereby corrected as shown below:

In the Claims

At Column 12, Claim number 3, Line number 53, please delete "is" after "controller"

At Column 12, Claim number 3, Line number 56, please delete "level" after "water"

Signed and Sealed this
Twenty-sixth Day of September, 2023

Katherine Kelly Vidal
*Director of the United States Patent and Trademark Office*